W. H. KEMPTON.
MOLDED ARTICLE AND METHOD OF MAKING THE SAME.
APPLICATION FILED OCT. 8, 1918.
1,370,024.
Patented Mar. 1, 1921.
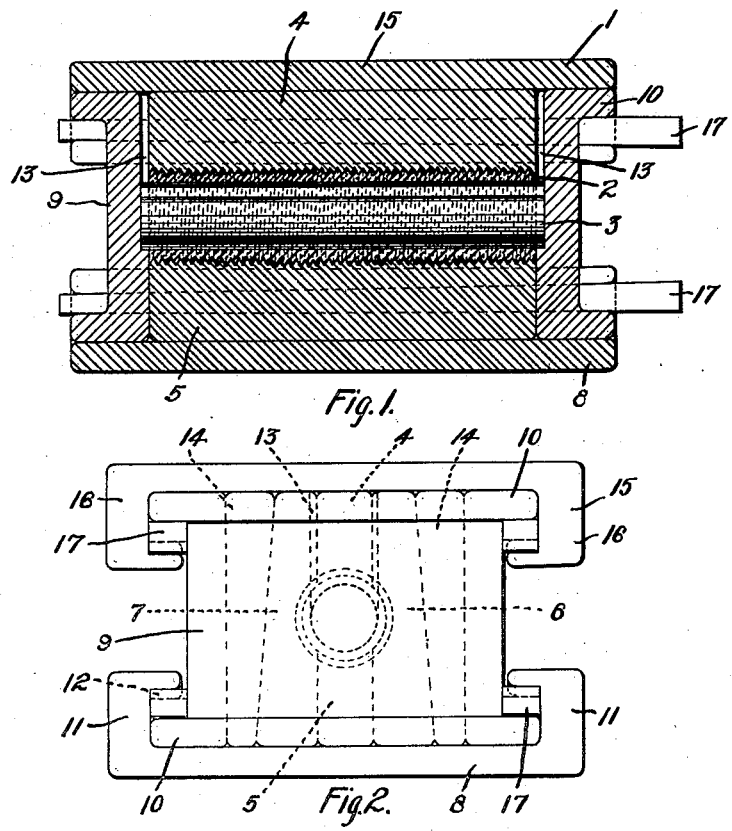
Fig. 1.
Fig. 2.
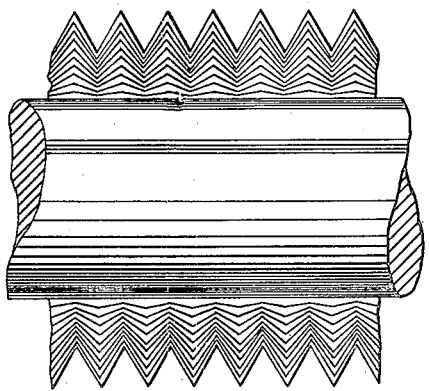
Fig. 3.
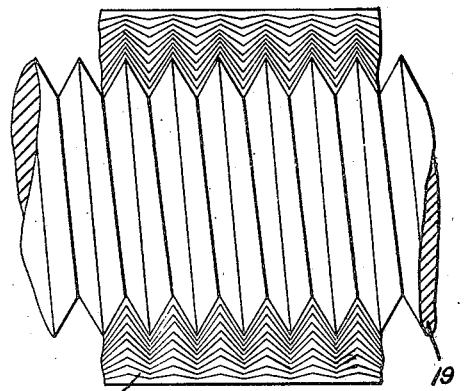
Fig. 4.
WITNESSES:
Ed. V. Herron
O. E. Bee.
INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED ARTICLE AND METHOD OF MAKING THE SAME.

1,370,024.  Specification of Letters Patent.  Patented Mar. 1, 1921.

Application filed October 8, 1918. Serial No. 257,390.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molded Articles and Methods of Making the Same, of which the following is a specification.

My invention relates to rods, tubes and the like comprising superimposed layers of impregnated sheet material having screw threads molded therein, and it has for its primary object the construction of such articles by a method which will insure a cheap and highly efficient product.

Heretofore, difficulty has been experienced in constructing strong threaded rods, tubes and the like comprising superimposed layers of impregnated sheet material by cutting the threads in the surface of the material. On account of the laminated structure of such articles, the cutting away of material to provide threads weakens the structure because only the binding action of the adhesive employed secures in place the layers of material constituting the threads. In view of this, one object of my invention is to construct rods, tubes and the like of impregnated sheet material and mold threads in their surfaces, thus eliminating any tendency to weaken the structure by cutting the material.

Another object of my invention is to manufacture rods, tubes and the like of impregnated sheet material by a method in the employment of which the articles may be threaded, pressed and cured in a single operation.

A further object of my invention is to provide rods, tubes and the like having threaded surfaces of such character that the greatest strength shall be at the points of greatest stress.

A further object of my invention is to construct articles of impregnated sheet material having threaded surfaces molded thereon which shall be unaffected by wide temperature changes, moisture, oils, weak acids and alkalis.

A still further object of my invention is to construct tubes of impregnated sheet material by a method which may be employed to provide threads on the inner or the outer surfaces of the tubes with the same facility.

With these and other objects in view, my invention will be more fully described; illustrated in the drawings, in the several views of which corresponding numerals indicate like parts, and then more particularly pointed out in the appended claims.

In the drawings, Figure 1 is a longitudinal, sectional view of a mold which may be employed in practising my invention, showing a tube, also in section, inclosed therein; Fig. 2 is an end view of the mold and tube inclosed therein shown in Fig. 1; Fig. 3 is a fragmentary, sectional view of a tube, embodying my invention, disposed about a mandrel which is shown in elevation, the dispostion of the material being exaggerated to clearly bring out the method of construction; Fig. 4 is a sectional view of a tube similar to that shown in Fig. 3 and illustrating the threading of the inner surface of a tube, a threaded mandrel, employed in this instance, being shown in elevation.

In practising my invention, I may construct a tube by impregnating suitable sheet material with a binder, such, for example, as a phenolic condensation product, and winding such material about a mandrel, after which the mandrel and the material disposed about it may be placed in a suitable mold and subjected to heat and pressure. The mold may have forming members, which may be provided with mating thread sections, which, when the members are disposed so as to surround the mandrel and the inclosing material and heat and pressure are applied, coact to form threads on the surface of the material as well as to compact the material and harden the binder with which it is impregnated. Furthermore, if a tube is desired having its inner surface threaded, the impregnated material may be wound about a threaded mandrel, and the mandrel and surrounding material may be disposed in a mold and subjected to heat and pressure.

Rods may be constructed by the method employed in forming tubes, the only difference being that the material is wound upon itself to form a solid roll rather than about a mandrel. The same method is employed to form the threads on the surface of the rod.

In Fig. 1 is shown a mold 1 which may be employed in constructing rods, tubes and the like in accordance with my invention, the mold, being of ordinary design, is here shown merely to clearly set forth the method of constructing rods or tubes in accordance with my invention and, on this account, only a brief description will be given of the mold and its several parts. The tube 2, shown inclosed in the mold 1, may be constructed by impregnating a sheet material, such as paper, duck, muslin, or cotton batting, with a suitable binder, such, for example, as a phenolic condensation product, after which the material may be dried to facilitate the handling of it. The material may then be wound about a mandrel 3 until a suitable thickness has been reached, and the mandrel 3 and the material disposed about it be surrounded by threaded forming members 4, 5, 6 and 7 of the mold 1. The mandrel 3 and inclosing forming members 4, 5, 6 and 7 may then be placed in the mold 1 so that the bottom forming member 5 rests upon, and is supported by, a bottom clamping plate 8 of the mold 1, which also supports the rectangular frame 9 of the mold 1, which has projecting edge portions 10. The bottom clamping plate 8 has upwardly extending flange portions 11 which are interiorly undercut and provided with wedge faces 12 so that wedge-shape openings are provided between the undercut flanges 11 and the extending portions 10 of the wall 9 of the mold 1. The wall 9 of the mold 1 has recesses 13 provided in which the ends of the mandrel 3 seat and are thus prevented from movement toward either side. The wedge members 14 may then be forced between the side forming members 6 and 7 and the wall 9 of the mold 1, and a top clamping plate 15 may be placed on the wedge members 14. The clamping plate 15 has downwardly projecting flange portions 16 interiorly undercut to provide openings between the extending flange portions 10 of the mold 1 and the downwardly projecting portions 16 of the clamping plate 15 when it is forced into position. Wedge members 17 may be driven into the openings thus provided by the upper and lower clamping plates 8 and 15 to hold the mold elements in their final positions.

Rods may be constructed in the manner described for forming tubes except that the impregnated material may be wound upon itself to form a solid roll instead of being wound about a mandrel, or the material may be wound about a preformed core of material similar to that constituting the outer layers, and the rod thus formed may be disposed in a mold, such as is shown in Fig. 1, and then be subjected to heat and pressure.

A tube 18, having its inner surface threaded, may be constructed by winding impregnated sheet material about a threaded mandrel 19, such as is shown in Fig. 4. The threaded mandrel 19 and material wound about it may be placed in a mold the forming members of which have smooth surfaces. After the tube thus formed is pressed and cured in a mold, it may be cooled and the mandrel may be removed by rotating it until forced out of the tube by the screw action.

Both rods and tubes constructed in the manner disclosed have threaded surfaces in which material is compacted more in some portions than in others, the denser portions of the material having greater mechanical strength than the less compacted portions. Since the stresses to which the threads are subjected are greatest near the bottoms of the groove portions, the greater mechanical strength attained at these places is of decided advantage. Furthermore, since the material is not cut to provide the threaded surface, the strength obtained by a continuous layer of material is retained.

Although I have described specifically the construction of rods, tubes and the like in accordance with my invention, it will be obvious that minor changes may be made therein without departing from the spirit thereof, and I desire, therefore, that no limitations shall be imposed except such as are indicated in the appended claims.

I claim as my invention:

1. A body formed of spirally wound sheet material and a hardened binder, the body having pressed-in portions providing a resultant screw thread in which the several layers of the sheet material are disposed substantially parallel to the faces of the thread.

2. A body formed of spirally wound sheet material and a hardened phenolic condensation product, the body having pressed in portions providing a resultant screw thread in which the several layers of the sheet material are disposed substantially parallel to the faces of the thread.

3. The method of constructing threaded rods, tubes and the like which comprises winding a binder impregnated fibrous sheet into a roll and subjecting the roll to heat and transverse pressure in a mold of a character such as to cause crimping of outer layers of the sheet material to provide a screw thread therein and to compact the roll and harden the binder.

4. The method of constructing interiorly threaded tubes which comprises impregnating sheet material with a binder, winding the impregnating material about a threaded mandrel, disposing the mandrel and the material wound about it in a suitable mold and applying heat and transverse pressure to compact the material and harden the binder.

5. The method of constructing interiorly threaded tubes which comprises impregnating sheet material with a phenolic condensation product, winding the impregnated material about a threaded mandrel, disposing the mandrel and the material wound about it in a suitable mold and applying heat and transverse pressure to compact the material and harden the binder.

In testimony whereof I have hereunto subscribed my name this 25th day of Sept. 1918.

WILLARD H. KEMPTON.